(12) United States Patent
Ghabra et al.

(10) Patent No.: US 9,924,318 B2
(45) Date of Patent: Mar. 20, 2018

(54) PASSIVE ENTRY SYSTEMS EMPLOYING TIME OF FLIGHT DISTANCE MEASUREMENTS

(71) Applicant: Lear Corporation, Southfield, MI (US)

(72) Inventors: Riad Ghabra, Northville, MI (US); Michael Li, Southfield, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 15/200,444

(22) Filed: Jul. 1, 2016

(65) Prior Publication Data

US 2018/0007507 A1 Jan. 4, 2018

(51) Int. Cl.
| | |
|---|---|
| *H04W 4/02* | (2018.01) |
| *H04W 24/08* | (2009.01) |
| *H04W 72/08* | (2009.01) |
| *H04B 1/3822* | (2015.01) |

(52) U.S. Cl.
CPC .......... *H04W 4/023* (2013.01); *H04B 1/3822* (2013.01); *H04W 24/08* (2013.01); *H04W 72/085* (2013.01)

(58) Field of Classification Search
CPC ... H04W 4/023; H04W 24/08; H04W 72/085; H04B 1/3822
See application file for complete search history.

(56) References Cited

U.S. PATENT DOCUMENTS

| | | | |
|---|---|---|---|
| 7,978,049 B2 | 7/2011 | Leitch | |
| 8,344,850 B2 | 1/2013 | Girard, III et al. | |
| 2002/0024427 A1 | 2/2002 | Banas | |
| 2003/0013146 A1* | 1/2003 | Werb | G01V 15/00 435/9 |
| 2003/0197640 A9* | 10/2003 | Johnson | B60R 25/33 342/357.75 |

(Continued)

FOREIGN PATENT DOCUMENTS

| | | |
|---|---|---|
| EP | 1869647 A1 | 12/2007 |
| GB | 2513206 A | 10/2014 |

(Continued)

OTHER PUBLICATIONS

Michael Tuechler, et al., IEEE International Conference on Ultra-Wideband, Location accuracy of an UWB localization system in a multi-path environment, Zurich, Sep. 2005.

(Continued)

*Primary Examiner* — Babar Sarwar
(74) *Attorney, Agent, or Firm* — Brooks Kushman P.C.

(57) ABSTRACT

Systems and methods employ ultra-wide band (UWB) time of flight (ToF) distance measurements for locating a portable device relative to a target. Performance and reliability of UWB ToF distance measurements for locating the portable device is improved by adjusting a communication retry strategy based on signal quality calculations. The quality of an UWB signal received by each satellite of a base station is assessed based on factors like signal strength, noise level, and ratio of first path signal power to total signal power. This data is used to direct the retry strategy to the satellites receiving the best signal quality for these satellites to conduct ToF distance measurements with the portable device and/or to add correction factors to calculated ToF distance measurements.

13 Claims, 4 Drawing Sheets

(56) References Cited

U.S. PATENT DOCUMENTS

| | | | |
|---|---|---|---|
| 2006/0077037 A1* | 4/2006 | Luo | B60R 25/24 340/5.72 |
| 2006/0226952 A1 | 10/2006 | Baumgartner et al. | |
| 2007/0090965 A1* | 4/2007 | McCall | G08B 21/24 340/8.1 |
| 2008/0252293 A1* | 10/2008 | Lagae | G01S 7/411 324/318 |
| 2010/0076622 A1* | 3/2010 | Dickerhoof | B60R 25/24 701/2 |
| 2010/0171642 A1* | 7/2010 | Hassan | G01C 17/38 340/992 |
| 2010/0304690 A1 | 12/2010 | Proefke et al. | |
| 2011/0148573 A1* | 6/2011 | Ghabra | B60R 25/245 340/5.61 |
| 2012/0062358 A1* | 3/2012 | Nowottnick | G06K 19/07767 340/5.2 |
| 2012/0218128 A1* | 8/2012 | Tieman | G01S 1/66 340/989 |
| 2013/0069760 A1* | 3/2013 | Lickfelt | H04B 17/29 340/5.61 |
| 2013/0143594 A1* | 6/2013 | Ghabra | H04W 24/00 455/456.1 |
| 2013/0185072 A1* | 7/2013 | Huang | G10L 15/30 704/246 |
| 2014/0285319 A1* | 9/2014 | Khan | G07C 9/00309 340/5.61 |
| 2014/0330449 A1* | 11/2014 | Oman | G01S 13/765 701/2 |
| 2015/0092584 A1* | 4/2015 | Jung | H04W 52/00 370/252 |
| 2015/0116081 A1* | 4/2015 | Nair | B60R 25/04 340/5.61 |
| 2015/0321643 A1* | 11/2015 | Nowottnick | B60R 25/245 340/5.6 |
| 2016/0042579 A1* | 2/2016 | Austen | G07C 9/00309 340/5.61 |
| 2016/0332598 A1* | 11/2016 | Ghabra | B60R 25/24 |

FOREIGN PATENT DOCUMENTS

| | | |
|---|---|---|
| WO | 2005088561 A2 | 9/2005 |
| WO | 2005114593 A1 | 12/2005 |
| WO | 2006059296 A2 | 6/2006 |

OTHER PUBLICATIONS

Intellectual Property Office, Combined Search and Examination Report for the corresponding GB Patent Application No. GB1621693.9 dated Jun. 21, 2017.

* cited by examiner

PASSIVE ENTRY SYSTEMS EMPLOYING TIME OF FLIGHT DISTANCE MEASUREMENTS

TECHNICAL FIELD

The present disclosure relates to passive entry systems employing time of flight distance measurements.

BACKGROUND

Passive entry systems include a portable remote control and a base station. The remote control, for instance, a key fob ("fob"), is carried by a user. The base station is at a target. The fob and the base station wirelessly communicate with one another for remote control of the target.

Passive entry functions provided by a vehicular passive entry system include automatically unlocking vehicle doors when the fob is detected near the vehicle. The system may detect for the fob in response to a vehicle door handle being touched.

The location of the fob relative to the vehicle should be detected as the user in possession of the fob can unlock the vehicle by simply manipulating the door handle. The fob should be in close proximity to the vehicle before unlocking the vehicle. Otherwise, unauthorized users may be able to unlock the vehicle whenever the fob is within the general vicinity of the vehicle. Traditional systems have used the received signal strength of radio frequency (RF) and/or low frequency (LF) wireless signals from the fob to the vehicle to determine the location of the fob. However, these systems can be vulnerable to security attacks which relay or amplify the wireless signals.

A system that uses propagation delay (i.e., time of flight (ToF)) of RF wireless signals between the fob and the vehicle to detect the location of the fob addresses this vulnerability. The time delay of a two-way RF wireless signal exchange between the fob and the vehicle can be used to calculate the distance between the fob and the vehicle since the propagation speed of the signal is constant. The operation involves recording and communicating timestamps of the transmissions and receptions of the signal exchange between the fob and the vehicle.

SUMMARY

Passive entry systems and methods employ ultra-wide band (UWB) time of flight (ToF) distance measurements for locating a portable device relative to a target. Performance and reliability of UWB ToF distance measurements for locating the portable device in non-ideal environments is improved by adjusting a communication retry strategy based on signal quality calculations. The quality of an UWB wireless signal received by each of a plurality of satellites or anchors ("satellites") of a base station at the target is assessed or measured based on factors like signal strength, environmental noise level, and ratio of first path signal power to total signal power. This data is analyzed and used to direct the retry strategy to the satellites receiving the best or highest signal quality for these satellites to take part in ToF distance measurements with the portable device and/or to add correction factors to calculated ToF distance measurements between the satellites and the portable device. As a result, total latency of the transmission sequence can be reduced and battery life of the portable device can be improved by using fewer retries and the ToF distance measurement accuracy can be improved.

A passive entry method includes assessing at each satellite of a base station a signal quality of a test signal received by the satellite from a remote control. The satellites having a higher signal quality than the remaining satellites are selected and time of flight (ToF) distance measurements with the remote control are conducted using the selected satellites.

Each satellite may include an ultra-wide band (UWB) transceiver and the remote control may include an UWB transceiver. In this case, assessing at each satellite a signal quality of a test signal received by the satellite from the remote control includes the UWB transceiver of the satellite assessing an UWB test signal received by the UWB transceiver of the satellite from the UWB transceiver of the remote control.

The method may further include detecting a distance between each satellite in a ToF distance measurement and the remote control based on a propagation time of an UWB distance measurement signal received by the UWB transceiver of the satellite from the UWB transceiver of the remote control and detecting a location of the remote control based on the detected distance between each of at least one of the satellites and the remote control.

The UWB transceiver of the satellite may assess the UWB test signal received by the UWB transceiver of the satellite by measuring at least one of noise level, first path signal power, and ratio of the first path signal power to total signal power of the received UWB test signal.

In this case, the detected distance may be corrected based on at least one of the measured noise level, first path signal power, and ratio of the first path signal power to total signal power. The location of the remote control may be detected based on at least the corrected detected distance.

A passive entry system includes a remote control and a base station having a controller and a plurality of satellites. Each satellite to assess a signal quality of a test signal received by the satellite from the remote control. The controller to direct the satellites having a higher signal quality than the remaining satellites to conduct ToF distance measurements with the remote control.

Another passive entry system includes a remote control having an UWB transceiver and a base station including a controller and satellites at respective locations of a target. Each satellite has an UWB transceiver. The UWB transceiver of each satellite to assess a signal quality of an UWB test signal received by the UWB transceiver of the satellite from the UWB transceiver of the remote control. The controller to direct the satellites having a higher signal quality than the remaining satellites to conduct UWB ToF distance measurements with the remote control for detecting the location of the remote control relative to the target.

Another passive entry method includes assessing by an UWB transceiver at a satellite of a base station a signal quality of an UWB signal received by the UWB transceiver from a remote control. A distance between the satellite and the remote control is detected based on a propagation time of the UWB signal received by the UWB transceiver from the remote control. The detected distance is adjusted according to the assessed signal quality of the UWB signal received by the UWB transceiver.

The UWB transceiver may assess the UWB signal received by the UWB transceiver from the remote control by measuring at least one of noise level, first path signal power, and ratio of the first path signal power to total signal power to assess the signal quality of the UWB test signal received by the UWB transceiver. In this case, the detected distance may be adjusted based on at least one of the measured noise level, first path signal power, and ratio of the first path signal power to total signal power.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
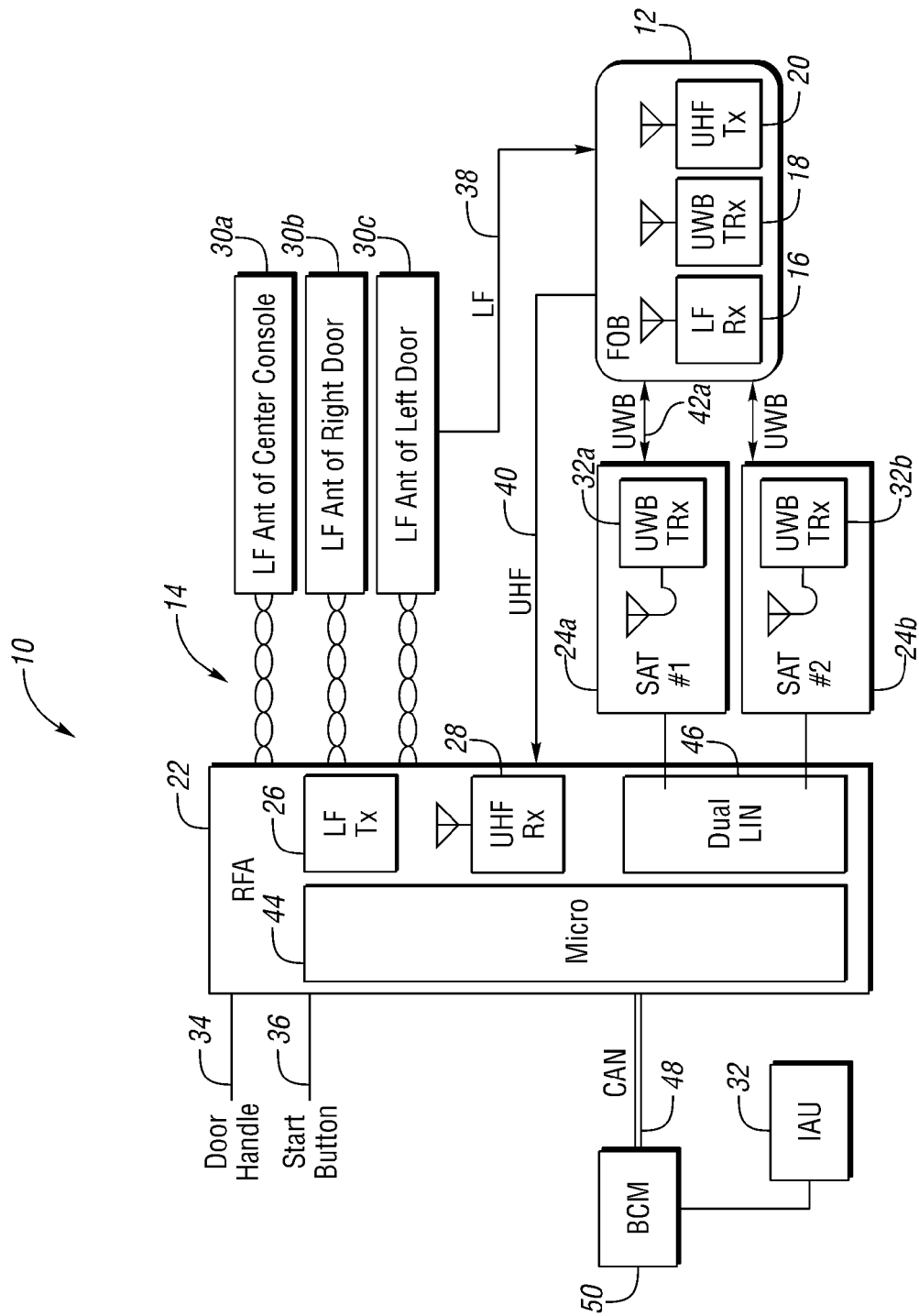
FIG. 1 illustrates a block diagram of a remote control system having a base station and a portable remote control.

Referring now to FIG. 1, a block diagram of a remote control system 10 is shown. Remote control system 10 includes a portable remote control 12 and a base station 14. Base station 14 is at a target such as a vehicle. In other embodiments, the target is a house, a garage, a gate, a building, a door, a lighting system, or the like. Base station 14 is configured to be able to control functions of the vehicle. Remote control 12 and base station 14 are operable for wirelessly transmitting/receiving signals to/from one another to enable the remote control to remotely control the vehicle via the base station.

Remote control system 10 is configured to perform passive entry passive start (PEPS) functions. PEPS capability enables remote control 12 to remotely control the vehicle automatically (or "passively") without user actuation of the remote control. As an example of a passive entry function, base station 14 unlocks a vehicle door in response to remote control 12 being in the vicinity of the vehicle. Base station 14 detects for the presence of remote control 12 in the vicinity of the vehicle when a user carrying the remote control touches a door handle of the vehicle. As an example of a passive start function, base station 14 starts the vehicle upon a user in possession of remote control 12 pressing a start button on the vehicle dashboard.

Remote control system 10 may be further configured to perform remote keyless entry (RKE) functions. RKE capability enables remote control 12 to remotely control the vehicle in response to user actuation of buttons or the like of the remote control. As an example of a RKE function, base station 14 unlocks a vehicle door in response to receiving a vehicle door unlock command from remote control 12. Remote control 12 transmits the vehicle door unlock command to base station 14 in response to corresponding user actuation of the remote control.

Remote control 12 is a portable device to be carried by a user. Remote control 12 is assumed to be a key fob ("fob"). In other embodiments, remote control 12 is a smart phone, a tablet, a wearable device such as a smart watch, or the like.

As shown in FIG. 1, fob 12 includes a low-frequency (LF) receiver 16, an ultra-wide band (UWB) transceiver (transmitter/receiver) 18, and an ultra-high frequency (UHF) transmitter 20. LF receiver 16, UWB transceiver 18, and UHF transmitter 20 have their own antennas as indicated in FIG. 1. LF receiver 16 is operable for receiving LF signals from base station 14. UWB transceiver 18 is operable for transmitting/receiving UWB signals. UHF transmitter 20 is operable for transmitting UHF signals to base station 14.

As further shown in FIG. 1, base station 14 includes a remote function actuator (RFA) 22 and first and second satellites or anchors ("satellites") 24a and 24b. RFA 22 and satellites 24a and 24b are located at the vehicle. Satellites 24a and 24b are positioned at respective locations of the vehicle (e.g., the right vehicle side and the left vehicle side).

Base station 14 may include additional satellites positioned at other respective locations of the vehicle. In one embodiment base station 14 includes at least three satellites and in another embodiment the base station includes three to twelve satellites. Only two satellites (first and second satellites 24a and 24b) are shown in FIG. 1. It is to be understood that additional satellites may be and likely are present. The satellites including first and second satellites 24a and 24b have the same functional configuration such as indicated in FIG. 1.

RFA 22 includes a LF transmitter 26 and a UHF receiver 28. LF transmitter 26 is associated with one or more LF antennas such as antennas 30a, 30b, and 30c. Antennas 30a, 30b, and 30c are positioned at respective locations of the vehicle (e.g., center console, right vehicle door, left vehicle door). LF transmitter 26 is operable for transmitting LF signals via antennas 30a, 30b, and 30c to LF receiver 16 of fob 12. UHF receiver 28 has its own antenna and is operable for receiving UHF signals from UHF transmitter 20 of fob 12. Satellites 24a and 24b include respective UWB transceivers 32a and 32b. UWB transceivers 32a and 32b are operable for transmitting/receiving UWB signals to/from UWB transceiver 18 of fob 12.

As examples, the LF operating frequency range is between 20 to 300 kHz; the UWB operating frequency range is between 3 to 10 GHz including a 3.5 to 6.5 GHz operating range; and the UHF operating frequency range is between 300 MHz to 3 GHz including a 300 MHz to 1 GHz operating range.

In regards to PEPS capability, fob 12 and base station 14 engage in a series of wakeup and authorization/authentication ("authorization") communications. The wakeup communications between fob 12 and base station 14 involve "waking up" the fob. The wakeup communications commence upon detecting a user action such as touching a door handle or pressing the vehicle start button. The authorization communications between fob 12 and base station 14 take place once the fob is woken up. The authorization communications involve authorizing the enablement of a vehicle function (e.g., unlocking a vehicle door or starting the vehicle) corresponding to the detected user action. The authorization communications are intended to verify that fob 12 is authorized for remotely controlling the vehicle.

RFA 22 initiates the wakeup communication process in response to detecting a user action such as touching a door handle or pressing the vehicle start button. In this regard, RFA 22 includes a door handle detection input 34 and a vehicle start button detection input 36. Upon the user action being detected, RFA 22 transmits a LF wakeup signal along LF communications link 38 for receipt by fob 12. Fob 12 wakes up in response to receiving the LF wakeup signal. In turn, fob 12 transmits an UHF acknowledgement signal along UHF communications link 40 for receipt by RFA 22.

RFA 22 commences the authorization communications upon receiving the UHF acknowledgement signal. The authorization communications commence with RFA 22 transmitting a LF encrypted challenge signal along LF communications link 38 for receipt by fob 12. Fob 12 generates a response for responding to the challenge signal upon receiving the LF challenge signal. In turn, fob 12 transmits an UHF encrypted response along UHF communications link 40 for receipt by RFA 22. RFA 22 receives the UHF encrypted response and analyzes the response to determine whether the response satisfies the challenge signal. If the response satisfies the challenge signal, then RFA 22 determines fob 12 to be authorized for remotely controlling the vehicle. Subject to the detected location of fob 12 relative to the vehicle, RFA 22 authorizes enablement of a vehicle function (e.g., unlocking a vehicle door) corresponding to the detected user action upon determining that fob 12 is authorized.

Remote control system 10 is configured to detect the location of fob 12 relative to base station 14 (i.e., the location of the fob relative to the vehicle). Remote control system 10 detects the location of fob 12 to ensure that, for instance, the fob is in close proximity to the vehicle before the remote control system unlocks the vehicle. Remote control system 10 employs time of flight (ToF) distance measurements involving UWB wireless signals between fob 12 and base station 14 to detect the location of the fob. Remote control system 10 calculates the location of fob 12 based on the time delay of a two-way UWB wireless signal exchange between the fob and base station 14.

More particularly, remote control system 10 calculates the location of fob 12 based on the time delay of a two-way UWB wireless signal exchange between fob 12 and one or more of the satellites of base station 14. The time delay of a two-way UWB wireless signal exchange between fob 12 and each particular satellite is indicative of the distance between the fob and that particular satellite. Hence, through the use of trilateration or the like, the location of fob 12 can be calculated based on the respective distances between fob 12 and each of at least three satellites. The general location of fob 12 (e.g., what side of the vehicle the fob is located) can be calculated based on the respective distances between the fob and each of two satellites. The distance of fob 12 from a portion of the vehicle where a particular satellite is located is calculated based on the distance between the fob and the particular satellite.

As such, further in regards to PEPS capability, fob 12 and base station 14 engage in UWB ToF communications for detecting the location of the fob relative to the vehicle. The location of the fob may be detected to prevent a relay attack.

The UWB radio frequency spectrum is well suited for ToF distance measurements due to wide bandwidth and low latency of the carrier frequency. However, this relatively high frequency spectrum presents a challenge when no clear line of sight (LOS) is between fob 12 and a satellite. In non-line of sight (NLOS) situations where the direct LOS is blocked, a wireless signal is heavily attenuated and the signal can be lost. Additionally, in NLOS situations where reflective surfaces are in the vicinity, the distance measurement can be corrupted as the ToF distance for the reflected paths may be measured instead of the direct "first path" ToF distance being measured since the first path signal may be lost.

As a result, reliable UWB ToF systems may require the base station to have multiple satellites which provide alternative paths and angles to a fob and/or may require multiple measurement attempts to each satellite before an accurate measurement can be obtained. Multiple satellites add cost and complexity to the system and a large amount of retry attempts increases the latency of the system and draws more electrical charge from the battery of the fob.

Features of remote control system 10 include minimizing the amount of satellites and/or the amount of measurement attempts ("retries") to achieve accurate ToF distance measurements. In general, base station 14 initially assesses the signal quality received by each satellite from fob 12 and then conducts ToF distance measurements using the satellites having the highest signal quality. That is, base station 14 uses the signal quality information of the satellites to direct subsequent ToF distance measurements with fob 12 only to, or preferentially to, the satellites having the highest signal quality.

Additionally, base station 14 may use the signal quality information of each particular satellite to determine and apply a correction factor to the ToF distance measurement involving the particular satellite. This allows ToF distance measurements previously rejected as inaccurate or out of range to be accepted, while eliminating the need for additional measurement attempts.

Figure 2:
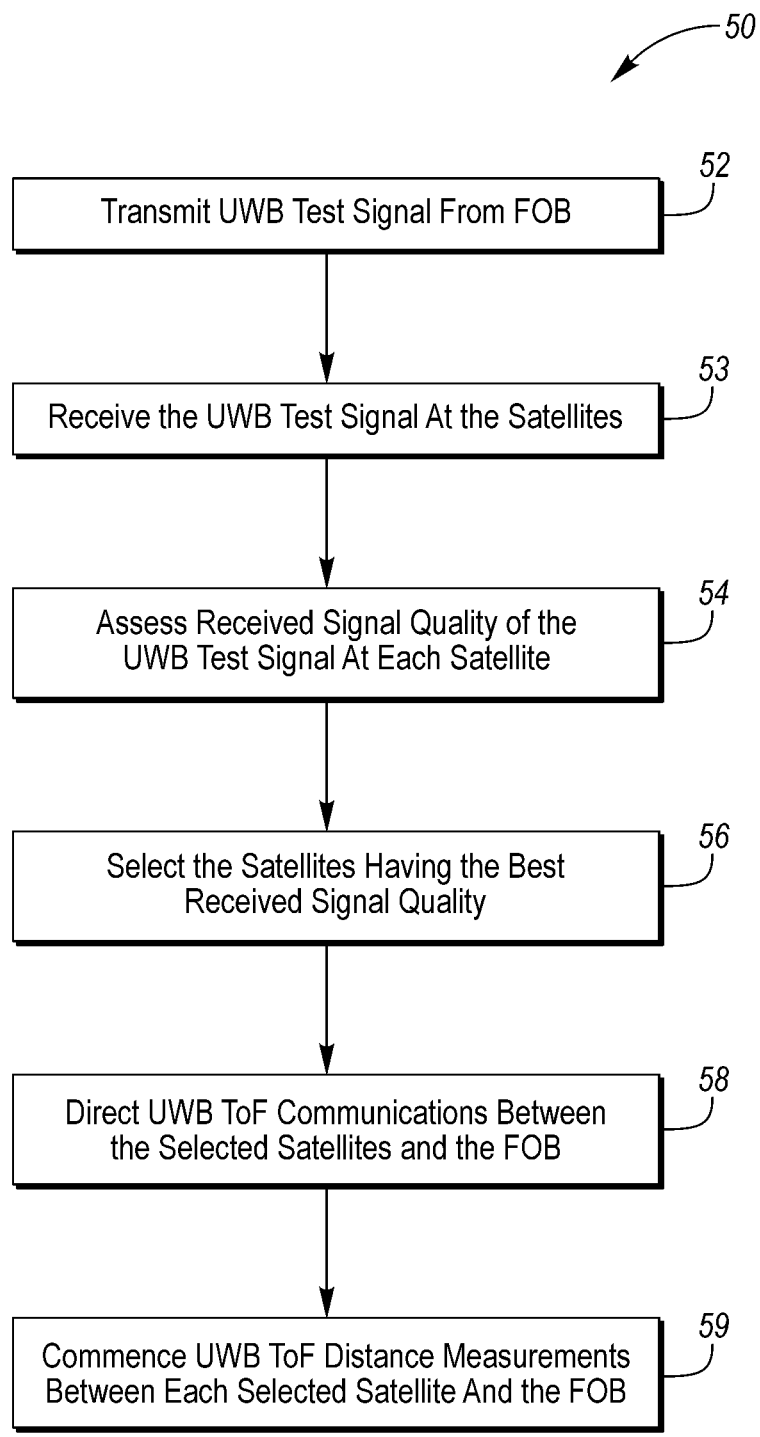
FIG. 2 illustrates a flowchart depicting operation of the remote control system for detecting the location of the portable remote control.

Referring now to FIG. 2, with continual reference to FIG. 1, a flowchart 50 depicting operation of remote control system 10 for detecting the location of fob 12 is shown. The operation may take place concurrently with the wakeup and authorization communications or may take place subsequent to the authorization communications. The operation begins with fob 12 transmitting an UWB test signal for receipt by the satellites of base station 14 as indicated in block 52. Fob 12 transmits the UWB test signal in response to RFA 22 of base station 14 instructing fob 12 to transmit the UWB test signal. For instance, RFA 22 transmits a request signal along LF communications link 38 for receipt by fob 12. The request signal requests fob 12 to transmit the UWB test signal. Alternatively, RFA 22 instructs one or more satellites to transmit the request signal along an UWB communications link for receipt by fob 12. In response to receiving the request signal, fob 12 transmits the UWB test signal via UWB transceiver 18 of the fob for receipt by one or more of the satellites.

The UWB transceivers of the satellites each may receive the UWB test signal from fob 12 as indicated in block 53. As the satellites are located at different positions the satellites have different signal quality in receiving the UWB test signal. In addition to the relative positioning of the satellites to fob 12, the difference in signal quality is affected by whether a clear LOS or a NLOS is between the satellites and the fob, whether reflective surfaces are between the satellites and the fob, the capabilities of the satellites relative to one another, and the like.

The received signal quality of the UWB test signal at each satellite is assessed or measured as indicated in block 54. For instance, the UWB transceiver of each satellite assesses or measures the received signal quality of the UWB test signal at that satellite. For example, UWB transceiver 32a of first satellite 24a assesses the signal quality of the UWB test signal received at the first satellite and UWB transceiver 32b of second satellite 24b assesses the signal quality of the UWB test signal received by the second satellite.

The UWB transceivers of the satellites including UWB transceivers 32a and 32b of satellites 24a and 24b and UWB transceiver 18 of fob 12 are commercially available UWB transceivers which provide certain diagnostic features to help assess the signal quality received by the UWB transceivers. The UWB transceiver of each satellite can provide signal quality indicators such as the total noise associated with the received frame, the total power of the received signal, and the power of the first path signal. These signal quality indicators, singly and in combination, can be used to determine whether the satellite and/or fob 12 are in a noisy environment, whether the satellite and/or the fob are in a reflective environment, whether an UWB signal communicated between the satellite and the fob will be attenuated, whether the satellite and the fob have a clear LOS or a NLOS, and the like.

Figure 3A:
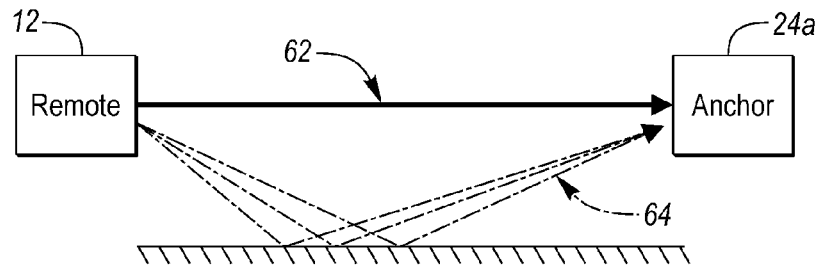
FIG. 3A illustrates a line of sight scenario between a satellite of the base station and the portable remote control.

For example, if the ratio of first path power to total power is high for the received UWB test signal at a satellite, then it can be inferred that either (i) the satellite and fob 12 have a clear LOS or (ii) the satellite and the fob are not in a reflective environment since the first path power is much higher than the sum of all other reflected path power. To distinguish between the two possibilities, the first path power amplitude can be assessed. If the first path power amplitude is high then it is inferred that the satellite and fob 12 have a clear LOS since the signal has not been attenuated by objects between them. As shown in FIG. 3A, in a clear LOS scenario the direct first path power 62 is strong compared to the reflection power 64.

Figure 3B:
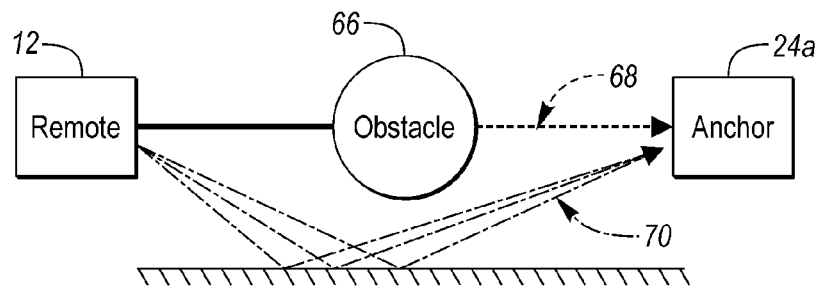
FIG. 3B illustrates a non-line of sight scenario between a satellite of the base station and the portable remote control.

On the other hand, if the ratio of first path power to total power is low for the received UWB test signal at a satellite, then it is inferred that either (i) an object is attenuating the first path signal or (ii) the direct path signal is completely lost (i.e., NLOS) and the received first path signal is actually a reflection. As shown in FIG. 3B, an object 66 attenuating the first path signal causes the received first path signal 68 to be weak or completely lost. As such, the direct first path signal 68 is attenuated and weak compared to the reflection power 70.

These and other factors can be used to estimate the likelihood of an accurate ToF distance measurement between a satellite and fob 12. Also, a correction factor can be added to inaccurate ToF distance measurements to produce an accurate ToF distance measurement.

As described so far with reference to flowchart 50 of FIG. 2, the operation for detecting the location of fob 12 includes the vehicle at the beginning of the measurement event requesting the fob to transmit the single UWB test signal for receipt by the satellites pursuant to block 52. The UWB transceivers of the satellites use this initial UWB test signal to assess the reception signal quality based on the criteria and procedures described above pursuant to block 54. For example, the reception signal quality of the UWB test signal by any of the satellites can be assessed simply on the basis of the received signal strength intensity (RSSI) of the received UWB test signal. The satellites communicate the signal quality assessments to RFA 22 of base station 14.

RFA 22 then selects the satellites having the highest received signal quality as indicated in block 56. RFA 22 then directs the satellites having the highest received signal quality to take part in subsequent UWB ToF distance measurements with fob 12 as indicated in block 58. For example, RFA 22 directs the satellites having the highest received signal quality to be the only satellite units to take part in the UWB ToF distance measurements with fob 12 or to be the preferred satellite units to take part in the UWB ToF distance measurements with the fob. In the latter scenario, more UWB ToF distance measurement attempts are allocated to the preferred satellites than to any of the remaining satellites.

An UWB ToF distance measurement attempt commences between each selected satellite and fob 12 as indicated in block 59. In particular, the UWB transceiver of each selected satellite transmits an UWB ranging signal for receipt by fob 12. Upon receiving the UWB ranging signal from a satellite, fob transmits an UWB reply signal for receipt by the satellite. The propagation time of an UWB signal communicated between the satellite and fob 12 is indicative of the distance between the satellite and the fob as described herein.

For example, assuming that first satellite 24a is a selected satellite, UWB transceiver 32a of the first satellite transmits an UWB ranging signal via an UWB communications link 42a for receipt by fob 12. Upon receiving the UWB ranging signal, UWB transceiver 18 of fob 12 transmits an UWB reply signal along UWB communications link 42a for receipt by first satellite 24a. The distance between first satellite 24a and fob 12 is calculated based on the propagation time of an UWB signal communicated between first satellite 24a and fob 12 as described herein. This is one UWB ToF distance measurement involving first satellite 24a. The measurement may not be successful for various reasons. As such, RFA 22 may direct one or more additional UWB ToF distance measurements ("retries") be attempted.

As described, the operation for detecting the location of fob 12 includes the vehicle directing the two-way UWB ToF measurement sequence with fob 12 to the satellites having the highest signal quality, directing more of the UWB ToF measurements to the satellites with the highest signal quality and fewer UWB ToF measurements to the satellites with the poorer signal quality, or the like.

In contrast, the operation of existing systems for detecting the location of a fob entails conducting UWB ToF distance measurements between all of the satellites and the fob without regard to which of the satellites are best suited to take part in the UWB ToF distance measurements. Consequently, system resources are wasted as the satellites less suited to take part in the UWB ToF distance measurements remain fully involved in the operation.

Figure 4:
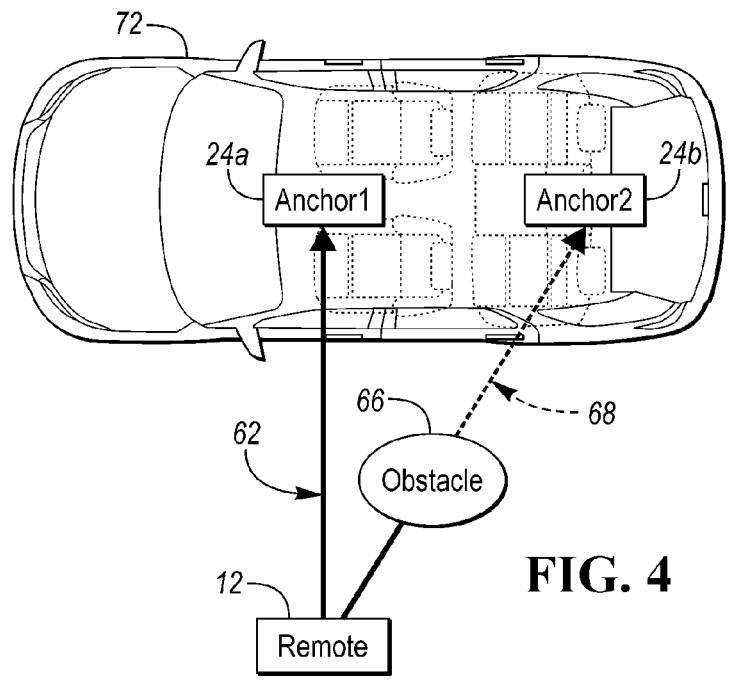
FIG. 4 illustrates a vehicular exemplary implementation of the operation of the remote control system in detecting the location of the portable remote control.

Referring now to FIG. 4, with continual reference to FIGS. 1, 2, 3A, and 3B, an exemplary implementation of the operation of remote control system 10 in detecting the location of fob 12 relative to a vehicle 72 having base station 14 is shown. The initial diagnostic UWB test signal messaging from fob 12 to satellites 24a and 24b reveals that first satellite 24a has a direct LOS with the fob whereas the signal path between second satellite 24b and the fob is blocked and attenuated by obstacle 66. Accordingly, RFA 22 directs the UWB ToF distance measurements only between first satellite 24a and fob 12. As a result, the amount of retries is reduced.

It is also possible to characterize the expected measured distance error in situations such as a reflective environment and/or NLOS between a satellite and fob 12. Since the signal quality indicators can be used to determine when these situations exist, the measured distance inaccuracy can be corrected by the expected error. For example, if a satellite believes that the satellite and fob 12 are in a NLOS situation where the direct signal is lost, then the satellite can determine that the actual measured distance is in fact a reflected path which will result in a longer measured distance versus the direct path. The difference between the most likely reflected path (e.g., the ground, other parts of the vehicle) and the direct path can be characterized and subtracted from the raw distances measured to obtain the correct direct path distance between the satellite and fob 12.

As described, the capability of the UWB transceivers in detecting noise level, first path signal power, and total power received can be used to determine direct versus reflected path. By calculating and comparing the three parameters (noise level, first path signal power, and total power received) information about direct versus reflected signal power received can be derived. As such, an inaccurate distance measurement can be corrected as it can be detected whether a received signal is a direct or reflected signal and thus an adjustment can be made in case of the received signal being a reflected signal.

Figure 5:
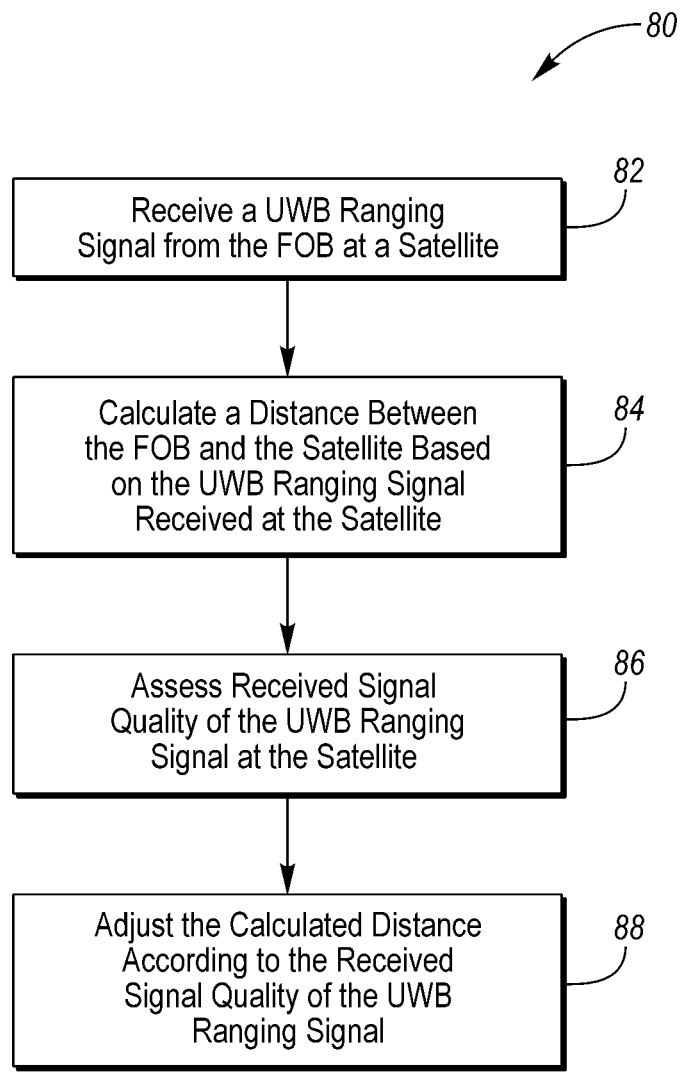
FIG. 5 illustrates a flowchart depicting alternate or additional operation of the remote control system for detecting the location of the portable remote control.

Referring now to FIG. 5, with continual reference to FIG. 2, a flowchart 80 depicting alternate or additional operation of remote control system 10 for detecting the location of fob 12 is shown. The operation of flowchart 80 is directed to correcting or adjusting inaccurate distance measurements as described herein. As further described herein, operation involving correcting or adjusting inaccurate distance measurements is alternate to or in addition to the operation of remote control system 10 according to flowchart 50 of FIG. 2.

As shown in FIG. 5, the operation of flowchart 80 includes an UWB ranging signal from fob 12 being received at a satellite pursuant to block 82. Base station 14 (for example, RFA 22) calculates a distance between fob 12 and the satellite based on the UWB ranging signal received at the satellite pursuant to block 84. For instance, the distance is calculated based on the propagation time of the UWB ranging signal as received at the satellite. The UWB transceiver assesses the received signal quality of the UWB ranging signal at the satellite pursuant to block 86. This is akin to an UWB transceiver of a satellite assessing the received signal quality of the UWB test signal pursuant to block 54 of flowchart 50 of FIG. 2. Base station 14 adjusts the calculated distance according to the received signal quality of the UWB ranging signal pursuant to block 88.

As shown in FIG. 1, RFA 22 further includes a microcontroller (or controller) 44 and a dual local interconnect network (LIN) 46. Microcontroller 44 monitors door handle detection input 34 and vehicle start button detection input 36 to detect user actuation of a door handle or the vehicle start button. Microcontroller 44 handles the wakeup and authorization communication processes of base station 14. Microcontroller 44 controls the transmitting and receiving operations of LF transmitter 26 and UHF receiver 28, respectively, in handling the associated wakeup and authorization communications. Microcontroller 44 is configured to communicate via dual LIN 46 with satellites 24a and 24b in regards to the ToF communications. The satellites include microcontrollers which handle the ToF communications process of the satellites. Microcontroller 44 communicates with the satellite unit microcontrollers in regards to the ToF communications.

As further shown in FIG. 1, RFA 22 may be in communication via a vehicle network such as a CAN bus 48 with other vehicle controllers such as a body control module (BCM) 50. Through CAN bus 48 and BCM 50, RFA 22 may communicate with an immobilizer antenna unit (IAU) 52. IAU 52 provides LF/LF immobilizer functions to fob 12 for backup starting (i.e., when the battery power of the fob is insufficient).

Other communication protocols which may be substituted in place of UWB for ToF capability include wide-band (WB), Doppler, and UHF.

While exemplary embodiments are described above, it is not intended that these embodiments describe all possible invention forms. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A passive entry method comprising:
assessing at each satellite of a base station a signal quality of a test signal received by the satellite from a remote control;
selecting by a controller of the base station the satellites having a higher signal quality than the remaining satellites;
conducting time of flight (ToF) distance measurements with the remote control using the selected satellites;
detecting a distance between each satellite in a ToF distance measurement and the remote control based on a propagation time of a distance measurement signal received by the satellite from the remote control; and
detecting a location of the remote control based on the distance between each of at least one of the satellites and the remote control.

2. The passive entry method of claim 1 wherein each satellite includes an ultra-wide band (UWB) transceiver and the remote control includes an UWB transceiver, wherein:
assessing at each satellite a signal quality of a test signal received by the satellite from a remote control includes the UWB transceiver of the satellite assessing an UWB test signal received by the UWB transceiver of the satellite from the UWB transceiver of the remote control.

3. The passive entry method of claim 2 wherein:
the UWB transceiver of the satellite assessing the UWB test signal received by the UWB transceiver of the satellite from the UWB transceiver of the remote control by measuring at least one of noise level, first path signal power, and ratio of the first path signal power to total signal power to assess the signal quality of the UWB test signal received by the UWB transceiver of the satellite.

4. The passive entry method of claim 3 further comprising:
detecting a distance between each satellite in a ToF distance measurement and the remote control based on a propagation time of an UWB distance measurement signal received by the UWB transceiver of the satellite from the UWB transceiver of the remote control;
correcting the detected distance based on at least one of the measured noise level, first path signal power, and ratio of the first path signal power to total signal power; and
detecting a location of the remote control based on at least the corrected detected distance.

5. The passive entry method of claim 1 wherein:
the signal quality is a received signal strength intensity (RSSI) of the test signal received by the satellite from the remote control.

6. The passive entry method of claim 1 further comprising:
prior to the step of assessing, transmitting from the base station to the remote control a request for the remote control to transmit the test signal.

7. A passive entry system comprising:

a remote control; and a base station having a controller and a plurality of satellites, each satellite to assess a signal quality of a test signal received by the satellite from the remote control, the controller to direct the satellites having a higher signal quality than the remaining satellites to conduct time of flight (ToF) distance measurements with the remote control;

wherein the controller further to detect a distance between each satellite in a ToF distance measurement and the remote control based on a propagation time of a distance measurement signal received by the satellite from the remote control; and wherein the controller further to detect a location of the remote control based on the distance between each of at least one of the satellites and the remote control.

8. The passive entry system of claim 7 wherein:

the signal quality is a received signal strength intensity (RSSI) of the test signal received by the satellite from the remote control.

9. A passive entry system comprising:

a remote control having an ultra-wide band (UWB) transceiver; and a base station including a controller and satellites at respective locations of a target device, each satellite having an UWB transceiver, the UWB transceiver of each satellite to assess a signal quality of an UWB test signal received by the UWB transceiver of the satellite from the UWB transceiver of the remote control, the controller to direct the satellites having a higher signal quality than the remaining satellites to conduct UWB time of flight (ToF) distance measurements with the remote control for detecting the location of the remote control relative to the target device; and wherein the controller further to detect a distance between each satellite in a ToF distance measurement and the remote control based on a propagation time of an UWB distance measurement signal received by the UWB transceiver of the satellite from the UWB transceiver of the remote control and to detect a location of the remote control relative to the target device based on the distance between each of at least one of the satellites and the remote control.

10. The passive entry system of claim 9 wherein:

the target device is a vehicle.

11. The passive entry system of claim 9 wherein: the UWB transceiver of each satellite to measure at least one of noise level, first path signal power, and ratio of the first path signal power to total signal power to assess the signal quality of the UWB test signal received by the UWB transceiver of the satellite; and the controller further to correct the detected distance based on at least one of the measured noise level, first path signal power, and ratio of the first path signal power to total signal power.

12. A passive entry method comprising:

assessing by an ultra-wide band (UWB) transceiver at a satellite of a base station a signal quality of an UWB signal received by the UWB transceiver from a remote control;

detecting a distance between the satellite and the remote control based on a propagation time of the UWB signal received by the UWB transceiver from the remote control;

adjusting the detected distance according to the assessed signal quality of the UWB signal received by the UWB transceiver; and detecting a location of the remote control based on at least the adjusted detected distance.

13. The passive entry method of claim 12 further comprising:

the UWB transceiver assessing the UWB signal received by the UWB transceiver from the remote control by measuring at least one of noise level, first path signal power, and ratio of the first path signal power to total signal power to assess the signal quality of the UWB test signal received by the UWB transceiver; and adjusting the detected distance based on at least one of the measured noise level, first path signal power, and ratio of the first path signal power to total signal power.

* * * * *